US012761890B2

(12) United States Patent
Jain et al.

(10) Patent No.: US 12,761,890 B2
(45) Date of Patent: Oct. 13, 2026

(54) MULTIPLEXING TENANT TUNNELS IN SOFTWARE-AS-A-SERVICE DEPLOYMENTS

(71) Applicant: Juniper Networks, Inc., Sunnyvale, CA (US)

(72) Inventors: Praveen Jain, Cupertino, CA (US); Natarajan Manthiramoorthy, Fremont, CA (US); Suresh Kumar Nalluru, San Jose, CA (US); Mahesh Kalappattil, Milpitas, CA (US); Krishnamurthy Kodundirapalli Padmanabhan, Cupertino, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 326 days.

(21) Appl. No.: 18/294,933

(22) PCT Filed: Aug. 5, 2022

(86) PCT No.: PCT/US2022/074631
§ 371 (c)(1),
(2) Date: Feb. 2, 2024

(87) PCT Pub. No.: WO2023/015311
PCT Pub. Date: Feb. 9, 2023

(65) Prior Publication Data

US 2025/0004738 A1 Jan. 2, 2025

Related U.S. Application Data

(60) Provisional application No. 63/236,943, filed on Aug. 25, 2021, provisional application No. 63/229,867, filed on Aug. 5, 2021.

(51) Int. Cl.
*G06F 9/44* (2018.01)
*G06F 8/61* (2018.01)
(Continued)

(52) U.S. Cl.
CPC .............. *G06F 8/61* (2013.01); *G06F 21/606* (2013.01); *H04L 12/4641* (2013.01)

(58) Field of Classification Search
CPC . G06F 8/61; G06F 9/505; G06F 21/53; G06F 21/606; H04L 12/4633;
(Continued)

(56) References Cited

U.S. PATENT DOCUMENTS 6,324,177 B1 11/2001 Howes et al.
9,887,960 B2 * 2/2018 Chanda ............... H04L 61/5014
(Continued)

FOREIGN PATENT DOCUMENTS

JP 2020205571 A * 12/2020 ........... H04L 49/354
WO 2020205006 A1 10/2020

OTHER PUBLICATIONS

Valentin Del Piccolo, A Survey of Network Isolation Solutions for Multi-Tenant Data Centers, 2016, pp. 2787-2818. https://ieeexplore.ieee.org/stamp/stamp.jsp?tp=&arnumber=7457217 (Year: 2016).*
(Continued)

*Primary Examiner* — Mongbao Nguyen
(74) *Attorney, Agent, or Firm* — Shumaker & Sieffert P.A.

(57) ABSTRACT

An example system includes a service provider, wherein the service provider is configured to: receive a connection request from an enterprise device via one or more communication networks, generate a route, a logical tunnel, and a first port number, instantiate, by the service provider, a service process configured to listen for network traffic at a first port associated with the first port number, store an association of the route to a logical tunnel interface for the logical tunnel with one of a plurality of virtual machines (VMs) and an association of the first port number with a source Internet protocol (IP) address obtained from the
(Continued)

connection request, and forward, to the first port, an application request received from the enterprise at a second port associated with a second port number and via a tunnel established with the enterprise device.

20 Claims, 10 Drawing Sheets

(51) Int. Cl.

| | |
|---|---|
| ***G06F 9/445*** | (2018.01) |
| ***G06F 9/45*** | (2006.01) |
| ***G06F 9/455*** | (2018.01) |
| ***G06F 21/60*** | (2013.01) |
| ***H04L 12/46*** | (2006.01) |

(58) Field of Classification Search

CPC ............. H04L 12/4641; H04L 63/0272; H04L 63/029; H04L 63/10; H04L 67/1001; H04L 67/1006; H04L 67/1021; H04L 45/64

See application file for complete search history.

(56) References Cited

U.S. PATENT DOCUMENTS

| | | | | |
|---|---|---|---|---|
| 10,574,584 | B1 | 2/2020 | Young | |
| 10,778,465 | B1 * | 9/2020 | Borle | H04L 45/02 |
| 2008/0080508 | A1 | 4/2008 | Das et al. | |
| 2017/0366395 | A1 * | 12/2017 | Goldfarb | H04L 12/4633 |
| 2017/0366416 | A1 * | 12/2017 | Beecham | H04L 41/22 |
| 2019/0081873 | A1 | 3/2019 | Kraft | |
| 2019/0103990 | A1 | 4/2019 | Cidon et al. | |
| 2020/0059370 | A1 * | 2/2020 | Abraham | H04L 45/645 |
| 2020/0099549 | A1 * | 3/2020 | Gummadidala | H04L 12/2856 |
| 2021/0058367 | A1 | 2/2021 | Shribman et al. | |
| 2021/0112034 | A1 * | 4/2021 | Sundararajan | H04L 12/4633 |
| 2022/0103525 | A1 * | 3/2022 | Shribman | G06F 16/9574 |
| 2022/0329513 | A1 * | 10/2022 | Woodworth | H04L 47/122 |
| 2023/0231799 | A1 * | 7/2023 | Sindhu | H04L 12/4633 370/235 |

OTHER PUBLICATIONS

C. Dixon, Software defined networking to support the software defined environment, 2014, pp. 1-14. https://ieeexplore.ieee.org/stamp/stamp.jsp?tp=&arnumber=6798742 (Year: 2014).*

English translation, Suzuki Kazuhiro (JP 2020205571 A), 2020, pp. 1-20. (Year: 2020).*

Li Erran Li, VSITE: a scalable and secure architecture for seamless L2 enterprise extension in the cloud, 2010, pp. 1-6. https://ieeexplore.ieee.org/stamp/stamp.jsp?tp=&arnumber=5634451 (Year: 2010).*

Partial Supplementary Extended Search Report from counterpart European Application No. 22854131.4 dated May 19, 2025, 20 pp.

Extended Search Report from counterpart European Application No. 22854131.4 dated Sep. 24, 2025, 27 pp.

International Search Report and Written Opinion of International Application No. PCT/US2022/074631 dated Oct. 19, 2022, 14 pp.

Response to Written Opinion dated Oct. 19, 2022 from International Application No. PCT/US2022/074631 filed filed Jun. 5, 2023, 20 pp.

International Preliminary Report on Patentability from International Application No. PCT/US2022/074631 dated Feb. 7, 2024, 25 pp.

* cited by examiner

MULTIPLEXING TENANT TUNNELS IN SOFTWARE-AS-A-SERVICE DEPLOYMENTS

RELATED APPLICATIONS

This application is a national stage entry of International Patent Application No. PCT/US2022/074631, filed 5 Aug. 2022, which claims the benefit of U.S. Provisional Application Ser. No. 63/229,867, entitled "METHODS FOR MULTIPLEXING TENANT TUNNELS IN SOFTWARE-AS-A-SERVICE DEPLOYMENTS AND DEVICES THEREOF," filed Aug. 5, 2021, and U.S. Provisional Application Ser. No. 63/236,943, entitled "METHODS FOR FACILITATING EFFICIENT HORIZONTAL SCALING IN SOFTWARE-AS-A-SERVICE DEPLOYMENTS AND DEVICES THEREOF," filed Aug. 25, 2021, the entire contents of each of which is incorporated by reference herein.

TECHNICAL FIELD

The disclosure relates generally to computer networks and, more specifically, to multiplexing network tunnels in computer networks.

BACKGROUND

Virtual private network (VPN) tunnels are commonly used to provide connectivity to software-as-a-service (SaaS) offerings. In some solutions, the VPN tunnels are terminated at customer sites or enterprise networks associated with a tenant in a multi-tenant SaaS deployment. In these solutions, the edge of the SaaS service receives a network address based on the configuration at the tenant and is responsible for isolating the network traffic associated with each tenant. The isolation of the network traffic is generally provided by using a separate virtual machine (VM) as a termination point of tunnels for each tenant, or by using a separate network namespace.

SUMMARY

In general, this disclosure describes one or more techniques for multiplexing network tunnels associated with multiple tenants or customers to services provided in a SaaS environment. In some aspects, a connection multiplexor of a service provider in a SaaS environment listens on a well-known port for connection requests. An incoming request can be assigned to a service process of a service provider that provides the service in the connection request. The service provider can be at an arbitrary port, and need not be a well-known port. The service provider can load balance the requests to applications configured to provide the service. Additionally, multiple service providers may be configured in a SaaS platform. A tunnel gateway can load balance requests for services among the different service providers.

Virtual private network (VPN) tunnels are commonly used to provide connectivity to software-as-a-service (SaaS) offerings. In some solutions, the VPN tunnels are terminated at the customer or enterprise network associated with a tenant in a multi-tenant SaaS deployment. In these solutions, the edge of the SaaS service receives a network address based on the configuration at the tenant and is responsible for isolating the network traffic associated with each tenant. The isolation of the network traffic is generally provided by using a separate virtual machine (VM) for each tenant or by using a separate network namespace.

Each of these approaches typically requires execution of a separate copy of a service process for each tenant in order to provide complete isolation and a separate key for each tenant during connection establishment. Executing a dedicated VM and/or service process per tenant is expensive and inefficient with respect to device resource utilization. Additionally, multiple service processes cannot listen to the same transmission control protocol (TCP) port. However, many firewall devices in enterprise networks are configured to block network traffic that is not associated with a well-known port (e.g., port 443 for hypertext transfer protocol (HTTP) secure (HTTPS) network traffic).

Further, VPN tunnels do not efficiently facilitate horizontal scaling for customer or enterprise network tenants in a multi-tenant SaaS deployment. In particular, each site (e.g., physical enterprise or on-premises device location) of a tenant currently requires its own tunnel having its own destination IP address endpoint corresponding with an instance of a service or application of the SaaS offering. Accordingly, to bring a new site online, an enterprise network host must establish a new tunnel to the SaaS and obtain a new destination IP address, which consumes significant resources, results in relatively complex network addressing topologies and network configurations, and adds complexity to horizontally scaling an enterprise network utilizing a SaaS deployment.

The techniques of this disclosure provide one or more technical advantages and practical applications. For example, multiple tenants of the service provider can share infrastructure, including hardware and processes. Different tenants can have internal networks that use the same private IP subnets with the associated network traffic separated using the techniques described herein. Port multiplexing avoids restrictions that may be placed on network traffic by tenant firewalls or other filtering devices, thereby allowing for the effective reuse of the same well-known port to efficiently receive requests from different tenants. Additionally, services are advantageously provided via the SaaS deployment more efficiently and with reduced resource consumption and lower cost.

Another advantage is that different sites and different locations can use the same service IP address to access a service in a SaaS environment. This can simplify network device configuration.

As a further advantage, each tenant of a SaaS deployment can use a respective destination IP address to access the service from any number of sites having different network namespaces. As a result, this technology facilitates independence of the number of tunnels and sites that can utilize services in a SaaS environment, and more efficient horizontal scaling within enterprise networks. For example, many sites or locations can be served by one tunnel, or many tunnels can serve one site or location.

In one example, this disclosure describes a method that includes receiving, by one or more processors implementing a service provider, a connection request from an enterprise device via one or more communication networks; generating, by the service provider, a route, a logical tunnel, and a first port number; instantiating, by the service provider, a service process configured to listen for network traffic at a first port associated with the first port number; storing an association of the route to a logical tunnel interface for the logical tunnel with one of a plurality of virtual machines (VMs) and an association of the first port number with a source Internet protocol (IP) address obtained from the connection request; and forwarding, to the first port, an application request received from the enterprise device at a second port associated with a second port number and via a tunnel established with the enterprise device.

In another example, this disclosure describes a system that includes one or more processors coupled to a memory; and a service provider executable by the one or more processors, wherein the service provider is configured to: receive a connection request from an enterprise device via one or more communication networks, generate a route, a logical tunnel, and a first port number, instantiate, by the service provider, a service process executable by the one or more processors and configured to listen for network traffic at a first port associated with the first port number, store an association of the route to a logical tunnel interface for the logical tunnel with one of a plurality of virtual machines (VMs) and an association of the first port number with a source Internet protocol (IP) address obtained from the connection request, and forward, to the first port, an application request received from the enterprise at a second port associated with a second port number and via a tunnel established with the enterprise device.

In further example, this disclosure describes a computer-readable medium having stored thereon, instructions, that when executed, cause one or more processors of a service provider to: receive a connection request from an enterprise device communicatively coupled to the service provider via one or more communication networks; generate a route, a logical tunnel, and a first port number; instantiate a service process executable by the one or more processors and configured to listen for network traffic at a first port associated with the first port number; store an association of the route to a logical tunnel interface for the logical tunnel with one of a plurality of virtual machines (VMs) and an association of the first port number with a source Internet protocol (IP) address obtained from the connection request; and forward, to the first port, an application request received from the enterprise device at a second port associated with a second port number and via a tunnel established with the enterprise device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
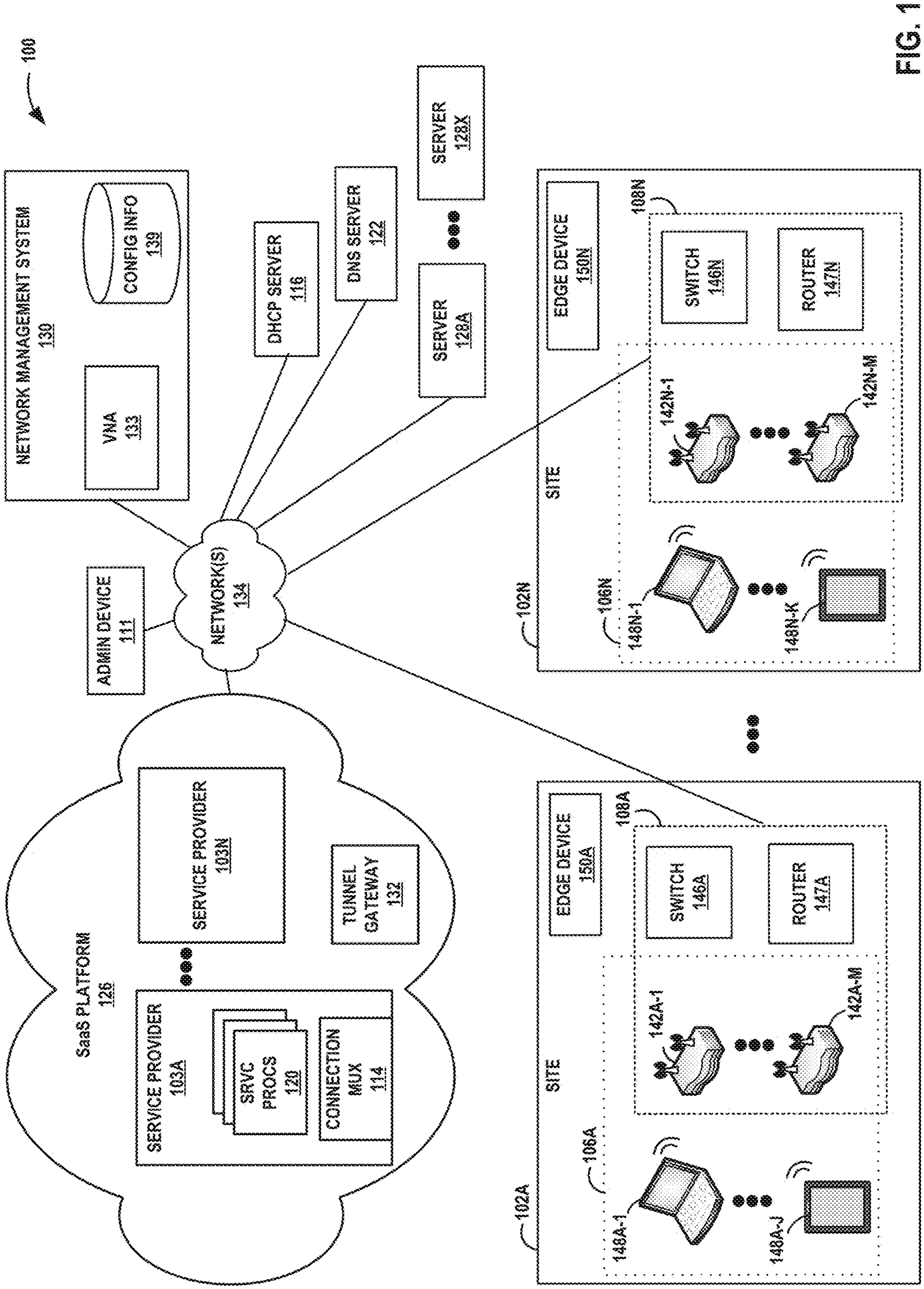
FIG. 1 is a block diagram of an example network system, in accordance with one or more techniques of the disclosure.

FIG. 1 is a block diagram of an example network system, in accordance with one or more techniques of the disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

Each site 102A-102N also includes a plurality of client devices, otherwise known as user equipment devices (UEs), referred to generally as UEs or client devices 148, representing various wireless-enabled devices within each site. For example, a plurality of client devices 148A-1 through 148A-J are currently located at site 102A. Similarly, a plurality of client devices 148N-1 through 148N-K are currently located at site 102N. Each client device 148 may be any type of wireless client device, including, but not limited to, a mobile device such as a smart phone, tablet or laptop computer, a personal digital assistant (PDA), a wireless terminal, a smart watch, smart ring, or other wearable device. Client devices 148 may also include wired client-side devices, e.g., IoT devices such as printers, security devices, environmental sensors, or any other device connected to the wired network and configured to communicate over one or more wireless networks 106.

In order to provide wireless network services to client devices 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1 as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, a Dynamic Host Configuration Protocol (DHCP) server 116 for dynamically assigning network addresses (e.g., IP addresses) to client devices 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1, the various devices and systems of network 100 are coupled together via one or more network(s) 134, e.g., the Internet and/or wide area network (WAN).

In the example of FIG. 1, NMS 130 is a cloud-based computing platform that manages wireless networks 106A-106N at one or more of sites 102A-102N. NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. In some examples, NMS 130 operates in response to configuration input received from the administrator interacting with and/or operating admin device 111.

NMS 130 provides a management plane for network 100, including management of enterprise-specific configuration information 139 for one or more of NAS devices 108 at sites 102. Each of the one or more NAS devices 108 may have a secure connection with NMS 130, e.g., a RadSec (RADIUS over Transport Layer Security (TLS)) tunnel or another encrypted tunnel. Each of the NAS devices 108 may download the appropriate enterprise-specific configuration information 139 from NMS 130 and enforce the configuration.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., servers 116, 122 and/or 128, APs 142, switches 146, routers 147, client devices 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 116, 122 and/or 128, APs 142, switches 146, routers 147, and client devices 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

Example network system 100 includes a Software-as-a-Service (SaaS) platform 126. SaaS platform 126 may be configured to provide services utilized by one or more of client devices 148 or other devices (e.g., enterprise devices 206 described below with respect to FIGS. 2 and 3. The services provided by SaaS platform 126 may be hosted on service providers 103A-103N, which may be servers (physical or virtual) that are part of SaaS platform 126. In some aspects, SaaS platform 126 may be implemented within one or more datacenters (not shown in FIG. 1). Various services may be provided by service processes 120. A service process 120 may be configured to provide a single service, or it may be configured as multiple micro-services. Services that may be provided by service processes 120 include network security, network access control, endpoint fingerprinting, and/or or network monitoring services, for example. Client devices and/or enterprise devices can utilize the services of a service provider 202 by communicating requests to service provider 202 and receiving responses from service processes that are configured to handle the requests. In some aspects, requests are received by connection multiplexor 214 at multiplexor port 215. Connection multiplexor 214 can utilize techniques described below to distribute requests to an appropriate service process 120A-120N.

In some aspects, SaaS platform 126 may include a tunnel gateway 132. Tunnel gateway 132 is a gateway or proxy device that terminates respective tunnels to networks that include various client devices and enterprise devices, one or more of which can be located at different sites 102. Tunnel gateway 132 can also perform network address translation (NAT) services and can establish generic routing encapsulation (GRE) tunnels to distribute application or service traffic to service providers 103.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring, and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106 to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

As illustrated in FIG. 1, NMS 130 may include VNA 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data. If the root cause may be automatically resolved. VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

Although the techniques of the present disclosure are described in this example as performed by SaaS platform 126, service provider 103, tunnel gateway 132, and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than SaaS platform 126, service provider 103, tunnel gateway 132, and/or NMS 130, or may be distributed throughout network 100, and may or may not form a part of SaaS platform 126, service provider 103, tunnel gateway 132, and/or NMS 130.

Figure 2:
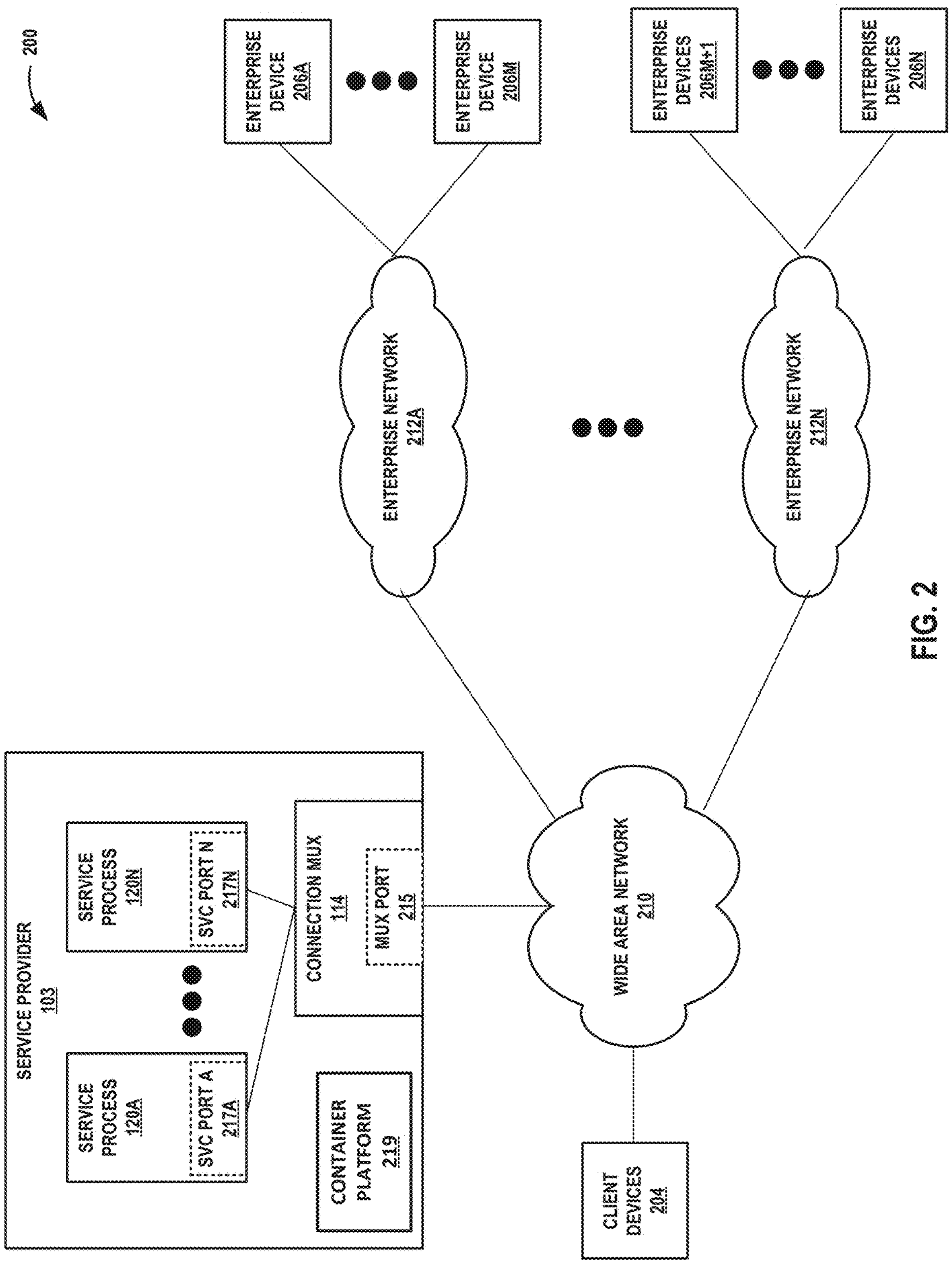
FIG. 2 is a block diagram illustrating logical connections between elements of an example network environment including a service provider having a connection multiplexor, in accordance with one or more techniques of the disclosure.

FIG. 2 is a block diagram illustrating example logical connections between elements of an example network environment including a connection multiplexor for a service provider, in accordance with one or more techniques of the disclosure. In the example shown in FIG. 2, example network environment 200 includes a service provider 103 coupled to client devices 204 via a wide area network (WAN) 210 (e.g., the Internet) and to enterprise devices 206A-206N (collectively enterprise devices 206) via WAN 210 and respective enterprise networks 212A-212N (collectively "enterprise networks 212"). Client devices 204 may be implementations of client devices 148 of FIG. 1. Service provider 103, enterprise devices 206, and client devices 204, may be coupled together via other topologies in other examples. Additionally, the network environment may include other network devices such as one or more routers or switches, for example, that are not shown in FIG. 2.

In some aspects, service processes 120 may be containerized services (or microservices) implemented using container platform 219. In some aspects, container platform 219 may be a Kubernetes platform. Containerization is a virtualization scheme based on operating system-level virtualization. Containers are light-weight and portable execution elements for applications that are isolated from one another and from the host. Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

Client devices 204 and/or enterprise devices 206 can utilize the services of a service provider 202 by communicating requests to service provider 103 and receiving responses from service processes 120 that are configured to handle the requests. Connection multiplexor can be configured to listen to a particular transmission control protocol (TCP) port, or particular subset of TCP ports. In some aspects, requests are received by connection multiplexor 114 at multiplexor port 215. Connection multiplexor 114 can utilize techniques described below to distribute requests to an appropriate service process 120A-120N that are configured to listen for network traffic associated with other TCP port numbers, service ports 217A-217N. In some examples, multiplexor port 215 can be a well-known port that network security devices such as firewalls are typically configured to allow. The network traffic may include requests for services provided by service provider 103. Connection multiplexor 114 can determine from the request, an appropriate service process 120 to handle the request and forward the request to a service port 217 associated with the service process. As an example, connection multiplexor 114 can be configured to listen for network traffic on a well-known TCP port 443 and forward the network traffic to TCP port 444 on which one of the service processes is listening. Accordingly, multiple tenants can use the same port to communicate with the service providers 103 apparatus thereby avoiding any restrictions imposed by firewall or other filtering devices in one or more of the enterprise networks.

Each of the enterprise devices 206 of the example network environment 200 in this example can include processor (s), a memory, and a communication interface, which are coupled together by a bus or other communication link (not illustrated), although other numbers or types of components could be used. The enterprise devices 206 in this example can include on-premises devices, such as application or database servers, that contain resources available to particular enterprise users of the client devices 204, although other types of devices can also be included in the network environment. Accordingly, the enterprise devices 206 are accessed by the client devices 204 and utilize a service (e.g., network access control) provided by the service provider 103.

In some examples, one or more of the enterprise devices 206 processes requests received from the client devices 204 via the WAN 210 and enterprise networks 212 according to the HTTP-based application RFC protocol, for example. A web application may be operating on one or more of the enterprise devices 206 and transmitting data (e.g., files or web pages) to the client devices 204 in response to requests from the client devices 204. The enterprise devices 206 may be hardware or software or may represent a system with multiple devices in a pool, which may include internal or external networks.

Although the enterprise devices 206 are illustrated as single devices, one or more actions of each of the enterprise devices 206 may be distributed across one or more distinct network computing devices that together comprise one or more of the enterprise devices 206. Moreover, the enterprise devices 206 are not limited to a particular configuration. Thus, the enterprise devices 206 may contain network computing devices that operate using a master/slave approach, whereby one of the network computing devices of the enterprise devices 206 operate to manage or otherwise coordinate operations of the other network computing devices. The enterprise devices 206 may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 204 of the network environment 200 in this example include any type of computing device that can exchange network data, such as mobile, desktop, laptop, Internet of Things (IOT), or tablet computing devices, virtual machines (including cloud-based computers), or the like. Each of the client devices in this example includes a processor, a memory, and a communication interface, which are coupled together by a bus or other communication link (not illustrated), although other numbers or types of components could also be used.

The client devices 204 may run interface applications, such as standard web browsers or standalone client applications, which may provide an interface to make requests for, and receive content stored on, one or more of the enterprise devices 206 via the WAN 210 and enterprise networks 212. The client devices 204 may further include a display device, such as a display screen or touchscreen, or an input device, such as a keyboard for example (not illustrated).

Although the exemplary network environment with the service provider 103, enterprise devices 206, client devices 204, WAN 210, and enterprise networks 212 are described and illustrated herein, other types or numbers of systems, devices, components, or elements in other topologies can be used. It is to be understood that the systems of the examples described herein are for exemplary purposes, as many variations of the specific hardware and software used to implement the examples are possible.

One or more of the components depicted in the network environment, such as the service provider 103, enterprise devices 206, or client devices 204, for example, may be configured to operate as virtual instances on the same physical machine. For example, one or more of the service providers 103, enterprise devices 206, or client devices 204 may operate on the same physical device rather than as separate devices communicating through communication network(s). Additionally, there may be more or fewer service providers 103, enterprise devices 206, or client devices 204 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, PDNs, the Internet, intranets, and combinations thereof.

Figure 3:
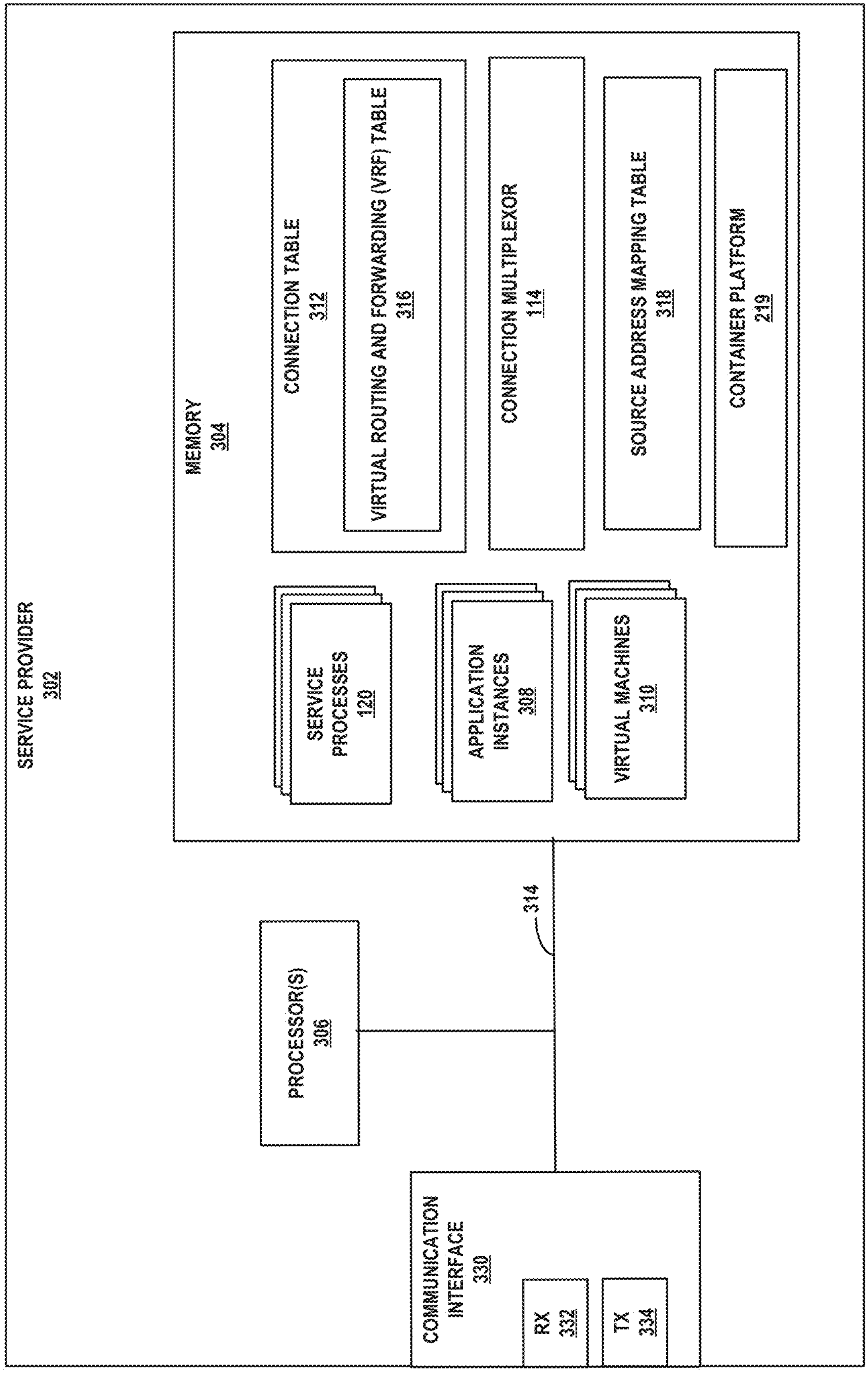
FIG. 3 is a block diagram of an example service provider, in accordance with one or more techniques of the disclosure.

FIG. 3 is a block diagram of an example service provider 302, in accordance with one or more techniques of the disclosure. Service provider 302 may be an implementation of service providers 103 of FIGS. 1, 2 and 3. In the example shown in FIG. 3, service provider 302 includes a communications interface 330, one or more processor(s) 306, and a memory 304. The various elements are coupled together via a bus 314 over which the various elements may exchange data and information. In some examples, service provider 302 may be part of another server shown in FIGS. 1 and 2 or a part of any other server.

Processor(s) 306 execute software instructions, such as those used to define a software or computer program, stored to a computer-readable storage medium (such as memory 304), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples service provider 302 to a network and/or the Internet, such as any of networks 134, 210 or 212 as shown in FIGS. 1-3 and/or any local area networks. Communications interface 330 includes a receiver 332 and a transmitter 334 by which service provider 302 receives/transmits data and information to/from any of client devices 204, enterprise devices 206, APs 142, switches 146, routers 147, edge devices 150, NMS 130, or servers 116, 122, 128 and/or any other network nodes, devices, or systems as shown in FIGS. 1-3.

Memory 304 includes one or more devices configured to store programming modules and/or data associated with operation of Service provider 302. For example, memory 304 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 304 includes service processes 120, application instances 308, virtual machines 310, connection table 312, connection multiplexor 114, source address mapping table 318, and container platform 219. Service provider 302 may also include any other programmed modules, software engines and/or interfaces configured to provide services to client devices 204 and/or enterprise devices 206.

Connection multiplexor 114 maintains a source address mapping table 318 that includes a mapping of source Internet protocol (IP) addresses associated with the enterprise devices 206 to corresponding port numbers. As noted above, in some aspects, connection multiplexor 114 can be configured to listen for network traffic on a well-known TCP port, obtain a source IP address from the network traffic, determine from the source address mapping table that the source IP address corresponds with a service port 217, and forward the network traffic to the service port on which one of the service processes 120 is listening. Accordingly, multiple tenants can use the same port to communication with the service provider 103 thereby avoiding any restrictions imposed by firewall or other filtering devices in one or more of the enterprise networks.

Service processes 120 are configured to listen for and process network traffic on designated port numbers as maintained in source address mapping table 318. In some examples, the processing of the network traffic includes managing a transport layer security (TLS) key exchange and cryptographic handshake with one of enterprise devices 206 based on a unique key maintained by each of service processes 120. Accordingly, service processes 120 establishes secure connections with the enterprise devices 206, decrypt network traffic exchanged via the secure connections, and forward the network traffic to virtual machines (VMs) 310.

Service processes 120 may be hosted on one or more of VMs 310. The particular one of the VMs 310 to which the network traffic is forwarded for a particular connection can be based on a load balancing decision and an association of a generated logical tunnel interface (e.g., synthetic IP address assigned upon connection establishment), with one of the VMs stored in the connection table. More than one logical tunnel interface can be assigned to any particular one of the VMs 310 to thereby spread the network traffic load across the VMs 310. In some aspects, containerized applications may be used instead of, or in addition to VMs 310.

In some examples, VMs 310 can be configured to receive network traffic (e.g., application requests) from the service processes and distribute the network traffic across the application instances 308 (e.g., based on another load balancing decision). While the application instances are illustrated in FIG. 3 as included in the memory, in other examples, the application instances can be hosted by backend devices (e.g., application servers), and a combination of such deployments can also be used to process the application traffic.

The application instances 308 can be configured to perform the service provided by the service provider 302, such as the network security, network access, fingerprinting, etc. functions identified above. Following the processing of an application request from an end-point device, one of the application instances 308 can be configured to respond to the application request (e.g., with network access permissions, fingerprinting results, etc.) via one of the service processes 120 and based on a generated route assigned to a particular one of the tunnel interfaces associated with the one of the endpoint device(s).

The generated route is maintained in virtual routing and forwarding (VRF) table 316 maintained in the connection table 312, although the VRF table 316 can be separate and other types of data structures can also be used in other examples. The route in the VRF table 316 designates the next hop for each data packet, a list of devices that may be called upon to forward the packet, and a set of rules and routing protocols that govern how the packet is forwarded. Accordingly, the VRF table 316 allows the network traffic to be automatically segregated and, because the routing instances are independent, the same or overlapping IP addresses can be used without conflicting with each other.

For example, the VRF table 316 can be configured to prevent network traffic from being forwarded outside of a specific VRF path between each of the endpoint device(s) and the service provider 302. Additionally, in some aspects, service provider 302 in this example can use an open systems interconnection (OSI) model Layer 3 input interface (i.e., the logical tunnel interface) to support multiple routing domains with each routing domain having its own interface and routing and forwarding table. Since the IP addresses can therefore overlap, the enterprise networks 212 can advantageously be extended to the cloud (i.e., the service provider 302 coupled via WAN 210) without any change in their IP addressing scheme. Accordingly, these techniques provide advantages of existing systems, including more efficient support of multi-tenancy by multiplexing connections, using VRF to isolate network traffic, and using the same hardware of the service provider 302, as well as the same VM and application instance, for multiple connections.

While the service provider 302 is illustrated in the example of FIG. 3 as including a single device, service provider 302 in other examples can include a plurality of devices each having processor(s) 306 that implement one or more aspects of the techniques described herein. In these examples, one or more of the devices can have a dedicated communication interface or memory. Alternatively, one or more of the devices can utilize the memory, communication interface, or other hardware or software components of one or more other devices included in a SaaS platform 126.

Additionally, one or more of the devices that together comprise service provider 302 in other examples can be standalone devices or integrated with one or more other devices or apparatuses, such as server devices hosting the application instances 308, for example, as explained above. Moreover, one or more of the devices of service provider 302 in these examples can be in a same or a different communication network including one or more public, private, or cloud networks, for example. In particular, a plurality of service providers can be geographically distributed and coupled to the WAN, with connections routed based on proximity, as explained in more detail below.

Figure 4:
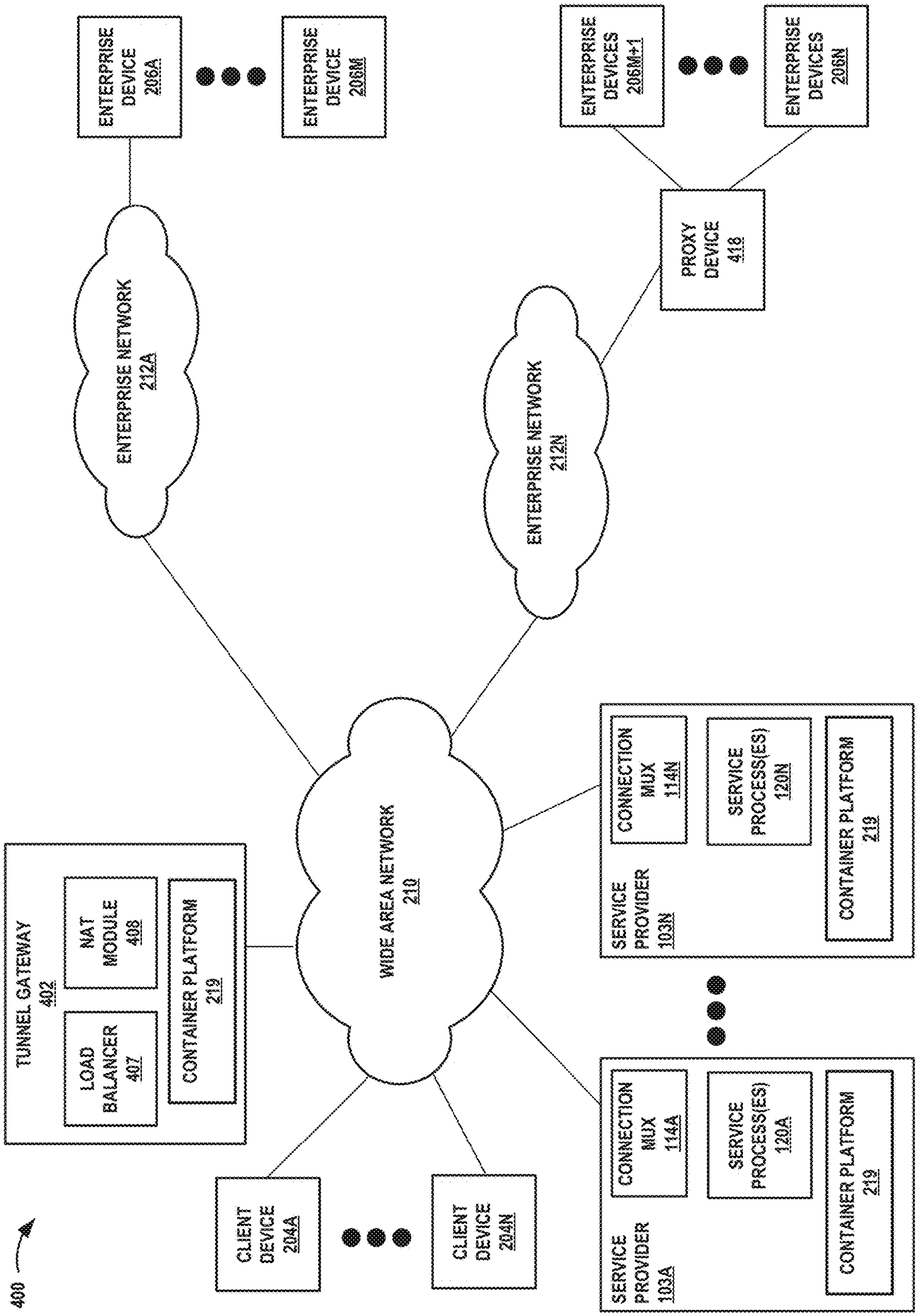
FIG. 4 is a block diagram illustrating an example network environment including a tunnel gateway, in accordance with one or more techniques of the disclosure.

FIG. 4 is a block diagram illustrating logical connections between elements of an example network environment including a tunnel gateway, in accordance with one or more techniques of the disclosure. In the example shown in FIG. 4, example network environment 400 includes a tunnel gateway 402 coupled via WAN 210 to service providers 103A-103N and enterprise networks 212 hosting enterprise devices 206. The enterprise devices 206 are also coupled to client devices 204 via WAN 210 and the enterprise networks 212 in this example, although tunnel gateway 402, service providers 202A-202N, enterprise devices 206, and client devices 204 may be coupled together via other topologies in other examples. A subset of enterprise devices 206 (e.g., enterprise devices 206M+1-206N in the example shown in FIG. 4) may also be coupled to the tunnel gateway 402 via proxy device 418 in the respective enterprise network. Additionally, the network environment may include other network devices such as one or more routers or switches, for example, that are not shown in FIG. 4.

In some aspects, tunnel gateway 402 includes network address translation (NAT) module 408. NAT module 408 can be configured to terminate VRF tunnels and to distribute network application request traffic to the service providers 103, 302 via GRE tunnels and application response traffic to enterprise devices 206. Further details on the operation of NAT module 408 are provided below with respect to FIGS. 5 and 8.

Load balancer 407 in this example can be configured to use stored logic to determine a number of service providers 103, 302 or application instances 308 within service provider 302 from FIG. 3 that should be allocated for a particular enterprise network site. The load balancer 407 then operates in conjunction with the NAT module 408 to select from the allocated service providers 103 or application instances 308 in order to direct application traffic in a load balanced manner.

The optional proxy device 418 of network environment 400 includes processor(s), a memory, and a communication interface, which are coupled together by a bus or other communication link (not illustrated), although other numbers or types of components could be used. Proxy device 418 can host some of the functionality of tunnel gateway 402 but within the enterprise network. In particular, the proxy device 418 can terminate a tunnel with one or more of the enterprise devices 206 in the same enterprise network 212 and then initiate a tunnel to tunnel gateway 402. Accordingly, the proxy device 418 in these examples allows simplified addressing so that multiple (or every) site associated with a tenant or enterprise can use the same IP address to access one of the service providers 103 or application instance 308 (i.e., the IP address of the tunnel endpoint hosted by the proxy device 418 from the perspective of the enterprise devices 206.

While tunnel gateway 402, service providers 103, and proxy device 418 are illustrated in this example as including a single device, tunnel gateway 402, service providers 103, and/or proxy device 418 in other examples can include a plurality of devices each having processor(s) (each processor with processing core(s)) that implement one or more techniques of this disclosure. In these examples, one or more of the devices can have a dedicated communication interface or memory. Alternatively, one or more of the devices can utilize the memory, communication interface, or other hardware or software components of one or more other devices included in tunnel gateway 402, service providers 103, and/or proxy device 418.

Additionally, one or more of the devices that together comprise tunnel gateway 402, service providers 103, and proxy device 418 in other examples can be standalone devices or integrated with one or more other devices or apparatuses. For example, the service providers 103 and tunnel gateway 402 could be integrated into the same device, tunnel gateway 402 can host application instances 308, and/or one of the enterprise devices 206 can host the proxy device 418.

Accordingly, one or more of the devices of tunnel gateway 402, service providers 103, and/or proxy device 418 in these examples can be in a same or a different communication network including one or more public, private, or cloud networks, for example. In particular, a plurality of service provider devices can be geographically distributed and coupled to the WAN 210, with connections routed or allocated based on proximity to one or more of the enterprise devices.

One or more of the components depicted in the network environment, such as the tunnel gateway 402, service providers 103, and/or proxy device 418, for example, may be configured to operate as virtual instances on the same physical machine. For example, one or more of tunnel gateway 402, service providers 103, and proxy device 418 may operate on the same physical device rather than as separate devices communicating through communication network(s). Additionally, there may be more or fewer tunnel gateways 402, service providers 103, proxy devices 418, enterprise devices 206, or client devices 204 than illustrated in FIG. 4.

Figure 5:
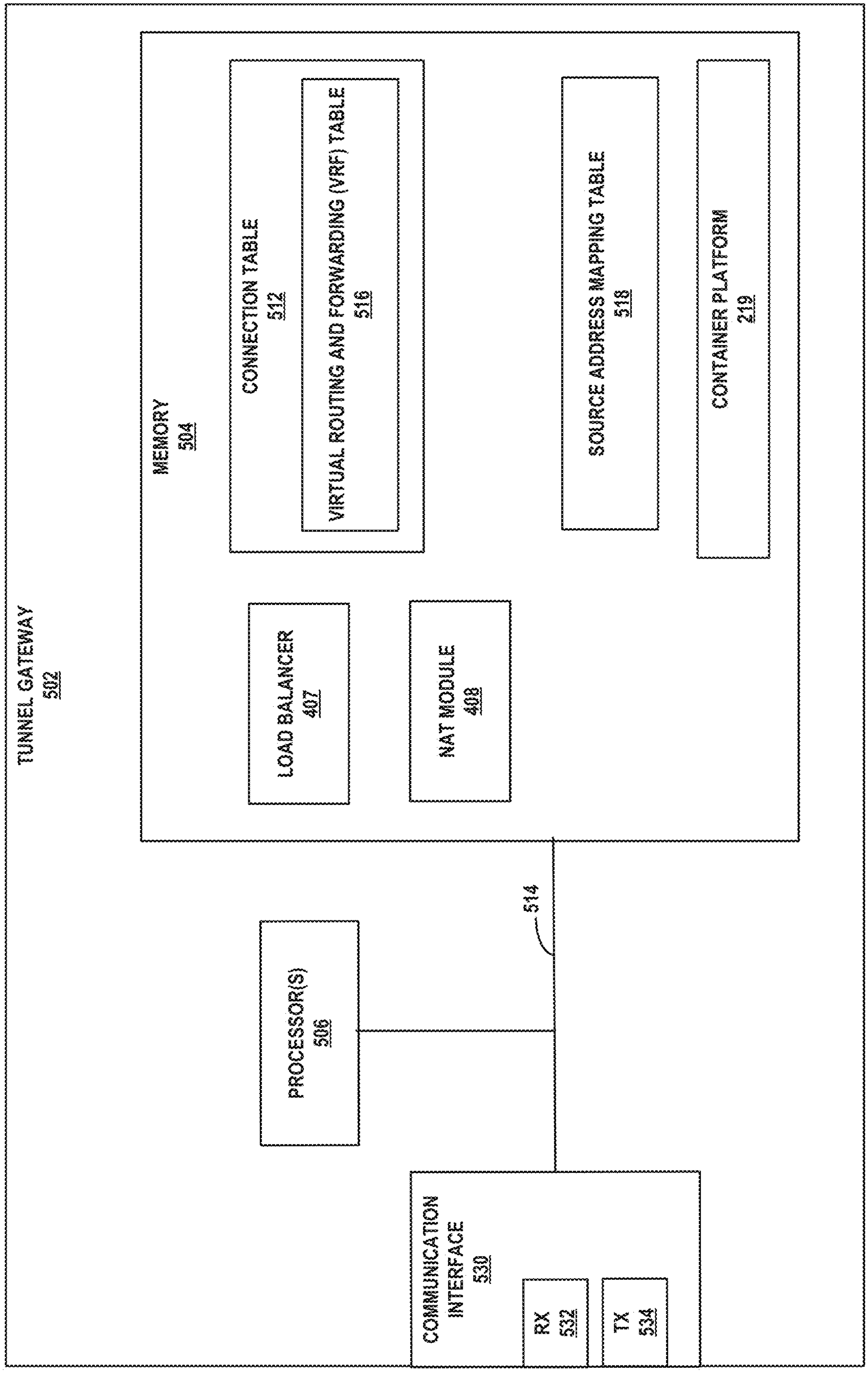
FIG. 5 is a block diagram of an example tunnel gateway, in accordance with one or more techniques of this disclosure.

FIG. 5 is a block diagram of an example tunnel gateway, in accordance with one or more techniques of this disclosure. Tunnel gateway may be an implementation of tunnel gateway 132, 402 of FIGS. 1 and 4. Tunnel gateway 502 includes a communications interface 530, one or more processor(s) 506, and a memory 504. The various elements are coupled together via a bus 514 over which the various elements may exchange data and information. In some examples, tunnel gateway 502 receives requests from enterprise devices to access services provided by service providers 103.

Processor(s) 506 execute software instructions, such as those used to define a software or computer program, stored to a computer-readable storage medium (such as memory 504), such as non-transitory computer-readable mediums including a storage device (e.g., a disk drive, or an optical drive) or a memory (such as Flash memory or RAM) or any other type of volatile or non-volatile memory, that stores instructions to cause the one or more processors 506 to perform the techniques described herein.

Communications interface 530 may include, for example, an Ethernet interface. Communications interface 530 couples Tunnel gateway 502 to a network and/or the Internet, such as any of networks 134, 210, and 212, as shown in FIGS. 1, 2 and 4 and/or any local area networks. Communications interface 530 includes a receiver 532 and a transmitter 534 by which Tunnel gateway 502 receives/transmits data and information to/from any of APs 142, switches 146, routers 147, enterprise devices 206, client devices 204, service providers 103, 302, or servers 116, 122, 128 and/or any other network nodes, devices, or systems forming part of network system 100 such as shown in FIGS. 1-4.

Memory 504 includes one or more devices configured to store programming modules and/or data associated with operation of tunnel gateway 502. For example, memory 504 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 506 to perform the techniques described herein.

In this example, memory 504 includes load balancer 507, NAT module 508, connection table 512, source address mapping table 518, and container platform 219. Tunnel gateway 502 may also include any other programmed modules, software engines and/or interfaces configured for load balancing network traffic and/or service requests between service providers 103, 402.

Tunnel gateway 502 is a gateway or proxy device that terminates respective tunnels to each of the enterprise networks 212 that include respective enterprise devices 206, one or more of which can be located at different physical premises, (e.g., sites 102) associated with enterprise networks 212. The tunnel gateway 502 also performs network address translation (NAT) services and establishes GRE tunnels to distribute application or service traffic to application instances 308 hosted by the service providers 103, 302. Although GRE tunnels may be used in some implementations, other types of network tunnels may be used, including IP security (IPsec), IP-in-IP, secure shell (SSH), Point-to-Point Tunneling Protocol (PPTP), Secure Socket Tunneling Protocol (SSTP), Layer 2 Tunneling Protocol (L2TP), and Virtual Extensible Local Area Network (VXLAN) tunnels.

NAT module 408 can be configured to use information maintained in connection table 512 to terminate VRF tunnels and to distribute network application request traffic to the service providers 103, 302 via GRE tunnels and application response traffic to enterprise devices 206.

Tunnel gateway 502 maintains routes in connection table 512 using VRF table 516. The routes maintained in VRF table 516 designate the next hop for data packets, a list of devices that may be called upon to forward the packet, and a set of rules and routing protocols that govern how the packet is forwarded. Accordingly, VRF table 516 allows the network traffic to be automatically segregated and, because the routing instances are independent, the same or overlapping IP addresses can be used without conflicting with each other.

For example, tunnel gateway 502 can configure VRF table 516 to prevent network traffic from being forwarded outside of a specific VRF path between each of the endpoint or enterprise device(s) and tunnel gateway 502. Additionally, tunnel gateway 502 in this example can use an OSI model Layer 3 input interface (i.e., the logical tunnel interface) to support multiple routing domains with each routing domain having its own interface and routing and forwarding table. Since the IP addresses can therefore overlap, the enterprise networks 212 can advantageously be extended to the cloud based systems such as SaaS platform 126 (i.e., the service provider 103, 302 coupled via network 134 or WAN 210) without any change in their IP addressing scheme.

Tunnel gateway 502 also use connection table 512 to maintain an association of source IP address associated with the enterprise devices 206 and allocated service providers 103 or application instance(s) 308, as well as associations to GRE tunnels to those allocated service providers 103 or application instance 308. Accordingly, the NAT module 508 can translate destination IP addresses and encapsulate and send the translated traffic via the GRE tunnels to the service providers 103 and application instances 308 as well as perform a reverse operation on the return traffic path to the endpoint devices.

Load balancer 407 in this example can be configured to use stored logic to determine a number of service providers 103 or application instances 308 that should be allocated for a particular enterprise network site. The load balancer 507 then operates in conjunction with the NAT module 508 to select from the allocated service providers 103 or application instances 308 in order to direct application traffic in a load balanced manner.

Figure 6:
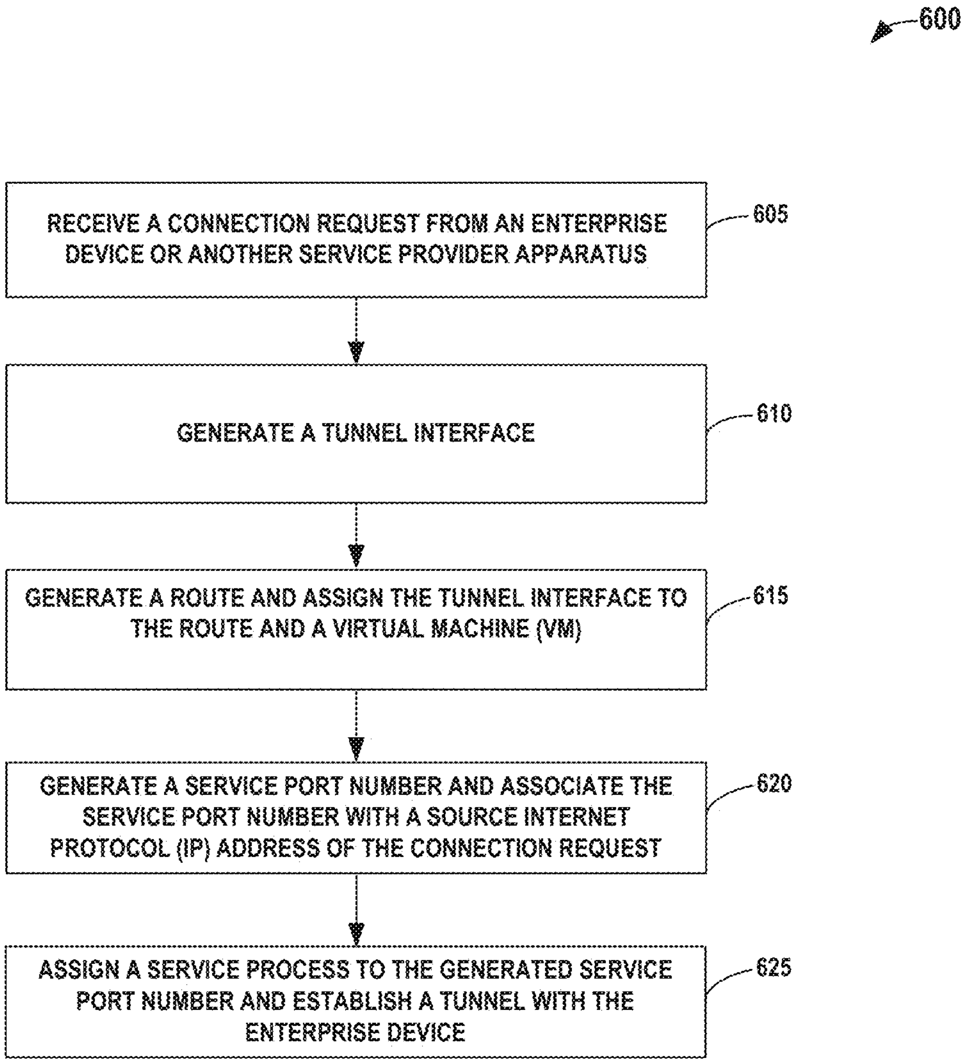
FIG. 6 is a flow diagram illustrating example operations of a method for establishing a tunnel in a multi-tenant SaaS deployment, in accordance with one or more techniques of this disclosure.

FIG. 6 is a flow diagram illustrating example operations of a method for establishing a tunnel in a multi-tenant SaaS deployment, in accordance with one or more techniques of this disclosure. A service provider 120 receives a connection request from one of the enterprise devices 206 or from another service provider (605). In some examples in which multiple service providers are deployed, one of the service providers can determine a geographic location of the one of the enterprise devices 206 (e.g., from a source IP address of the connection request) and identify (e.g., from a stored, distributed table) whether it or another service provider is geographically closer to the one of the enterprise devices. If another service provider is in closer proximity, the service provider can forward the connection request to that service provider.

The connection request can be in response to a request from a client device to access a resource (e.g., an application) hosted by the one of the enterprise devices 206, for example, although the connection request can be initiated in response to other network activity. In this example, the connection request can initiate a network access validation by the one of the enterprise devices 206 to determine whether to allow, and/or the parameters of, access by the client device. Accordingly, the service provider in this example provides network access control services, but any other type of service can be provided in other examples.

The service provider generates a tunnel interface, which can be a logical interface, such as an OSI model network or Layer 3 interface (610). The logical tunnel interface can be assigned an IP address upon establishment of the connection, which can be used within the connection by the one of the enterprise devices and the service provider to direct network traffic appropriately.

The service provider generates a route and assigns the tunnel interface to the route and to one of the VMs (615). The assignment can be maintained in a connection table, for example. The route includes next hop information for a virtual path between the one of the enterprise devices and the service provider device. In some aspects, the VMs can be selected in order to balance load across the VMs. Accordingly, the one of the VMs can be associated with any number of connections associated with tenants of the service provider.

The service provider generates a server port number and assigns the server port number to a source IP address obtained from the connection request received in 605 (620). The assignment of the server port number to the source IP address can be maintained in the source address mapping table to be used by the connection multiplexor to distribute network traffic receive at one port number (e.g., a well-known TCP port number) across the server port number and other generated server port numbers associated with other connections.

The service provider assigns one of the service processes to the generated server port number and establishes a tunnel with the enterprise device. The assigned service process can be assigned to the generated server port number by being configured to listen for network traffic associated with the generated server port number. In some aspects, once configured, the service process can establish the tunnel with the enterprise devices by exchanging a server key, and performing a cryptographic handshake, with the enterprise device and communicating with the enterprise devices based on the route generated in operation 615 (625).

Figure 7:
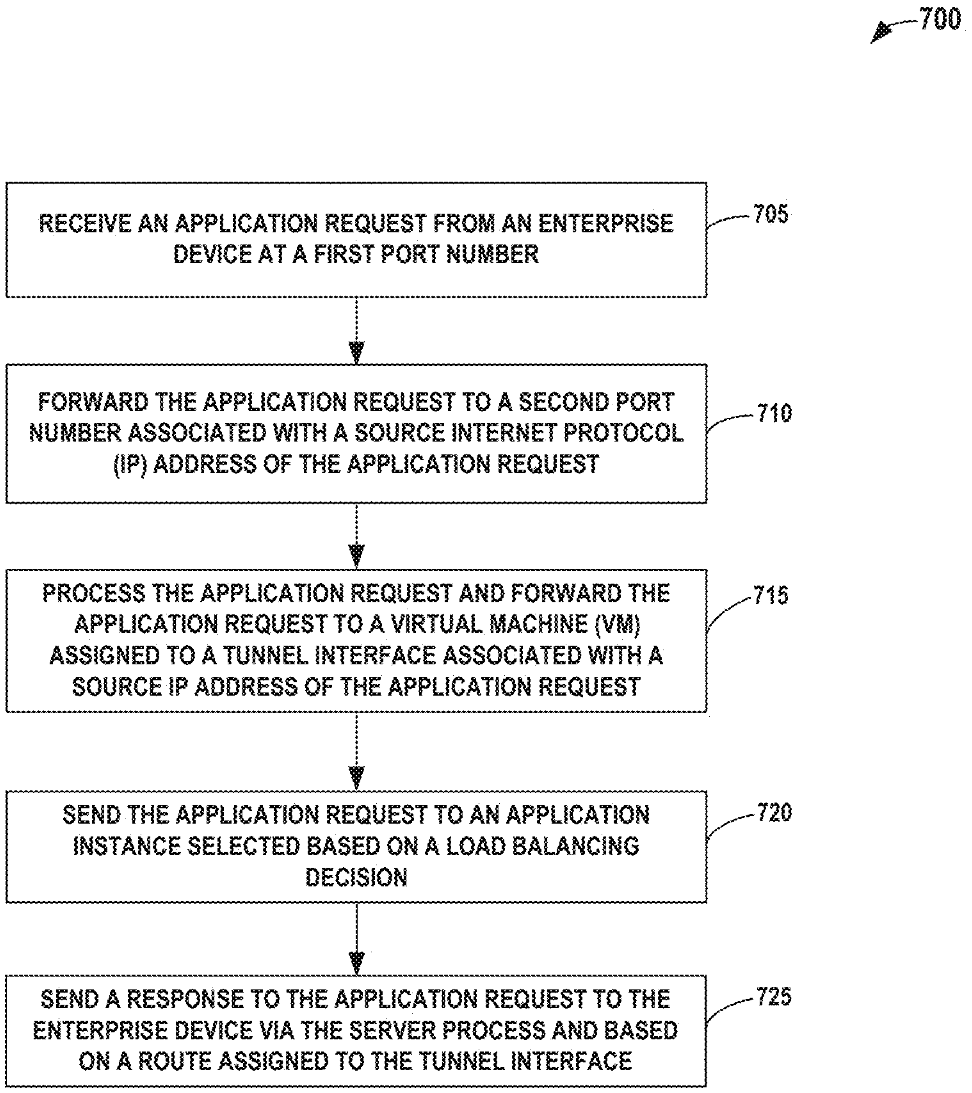
FIG. 7 is a flow diagram illustrating example operations of a method for processing network traffic associated with an established connection in a multi-tenant SaaS deployment.

FIG. 7 is a flow diagram illustrating example operations of a method for processing network traffic associated with an established connection in a multi-tenant SaaS deployment. A service provider receives an application request from one of the enterprise devices at a first port number, which can be a well-known TCP port number, for example, port 80 or 443 (705). The application request can be sent subsequent to a connection request, via an established connection, and can include the client details requiring authentication in the example illustrated in FIG. 6 above in which the service provider provides a network access control service, although other types of application requests and services can also be used in other examples.

A connection multiplexor of the service provider forwards the application request to a second port number associated with a source IP address obtained from the received application request (710). The connection multiplexor is configured to listen for network traffic associated with the first port number, obtain the source IP address from the application request, identify the second port number corresponding to the source IP address in the source address mapping table, and forward the application request to the second port number.

A service process executed by the service provider, and configured to listen for network traffic associated with the second port number, processes the application request and forwards the application request to one of the VMs assigned to a tunnel interface associated with the source IP address obtained from the application request (715). The application request can be processed (e.g., decrypted) according to the negotiated cryptographic parameters of the connection. The VM can be identified based on a stored association of the source IP address to the logical tunnel interface and of the logical tunnel interface to the VM, for example.

The selected VM executed by the service provider sends the application request to one of the application instances, which can be selected based on a load balancing decision (720). Accordingly, the application instances can each be utilized by any number of VMs associated with any number of connections to the enterprise devices.

The selected application instance processes the application request and generates a response, which the service provider sends to the source enterprise device via the one of the service processes (725). The service provider can send the response based on a route stored in the VRF table, for example, and assigned to the tunnel interface identified in operation 715. Using the VRF route allows the network traffic associated with the particular connection between the service provider and the one of the enterprise devices to be isolated from network traffic associated with other tenants.

Figure 8:
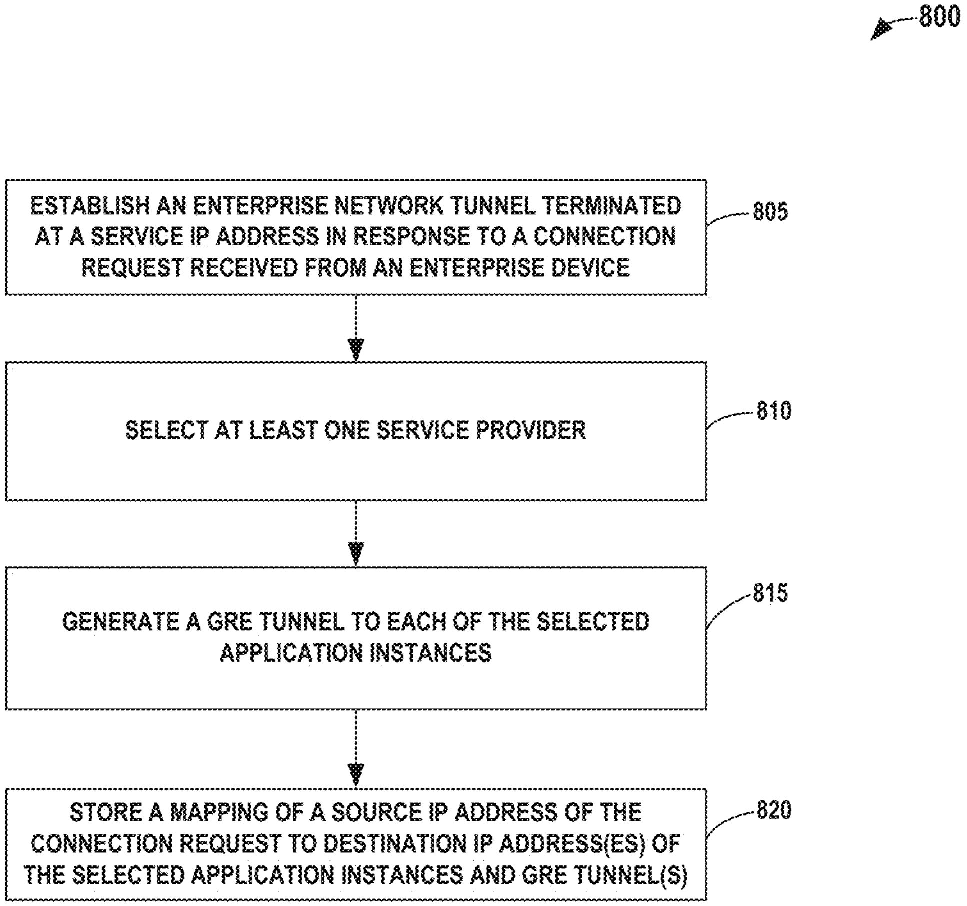
FIG. 8 is a flow diagram illustrating example operations of a method for facilitating horizontal scaling in multi-tenant SaaS deployment is illustrated, in accordance with one or more techniques of the disclosure.

FIG. 8 is a flow diagram illustrating example operations of a method for facilitating horizontal scaling in multi-tenant SaaS deployment is illustrated, in accordance with one or more techniques of the disclosure. A tunnel gateway establishes an enterprise network tunnel terminated at a service destination IP address in response to a connection request received from one of the enterprise devices (805). The connection request can be in response to a request from one of the client devices to access a resource (e.g., an application) hosted by the enterprise device, for example, although the connection request can be initiated in response to other network activity. In this example, the client request can prompt the one of the enterprise devices to determine whether to allow, and/or the parameters of, access to the resource. Accordingly, the service provider in this example provides network access control services, but any other type of service can be provided in other examples.

The tunnel gateway generates a tunnel interface, which can be a logical interface, such as an OSI model network or Layer 3 interface. The logical tunnel interface can be assigned an IP address upon establishment of the connection, which can be used by each of the enterprise devices associated with the enterprise network. In some examples, the tunnel is a VRF tunnel, which can be established as above. The tunnel gateway device in these examples generates a route and assigns the tunnel interface to the route. The assignment can be maintained in the connection table, for example. The route includes next hop information for a virtual path between the one of the enterprise devices and the tunnel gateway device.

The tunnel gateway device selects at least one service provider from one or more service provides (810). In some aspects, the selected service provider can be a service provider may host one application instance. In some aspects, the selected service provider may host multiple application instances. In some aspects, the service provider and/or the application instances can be executed as virtual machines. In the example described and illustrated herein, the application instances are virtual, each of the service provider devices hosts a plurality of virtual application instances, and the tunnel gateway device selects from the plurality of virtual application instances across any number of the service provider devices.

A load balancer can be configured to determine the number of selected application instances based on predefined criteria, such as the likely load or scale expected from the site associated with the one of the enterprise devices by way of example. The virtual application instances allocated to particular sites can also be dynamic and updated after observed behavior in other examples.

The tunnel gateway device generates a GRE tunnel to each of the application instance(s) selected at operation 810 (815). In examples in which the application instance(s) are hosted by the same device or cluster as the tunnel gateway device, operation 815 may not be performed. However, if the tunnel gateway device is indirectly connected to service providers hosting the application instance(s) (e.g., via a WAN as illustrated in FIG. 2) GRE tunnels may be utilized.

The tunnel gateway device stores a mapping of a source IP address obtained from the connection request with a destination IP addresses of the application instance(s) and GRE tunnel(s) generated at operation 810 for each of the corresponding service providers or application instances (815). The mapping can be stored in the connection table and can facilitate subsequent routing of application data originated via the enterprise network tunnel established at operation 805 as will now be explained with reference to FIG. 9.

Figure 9:
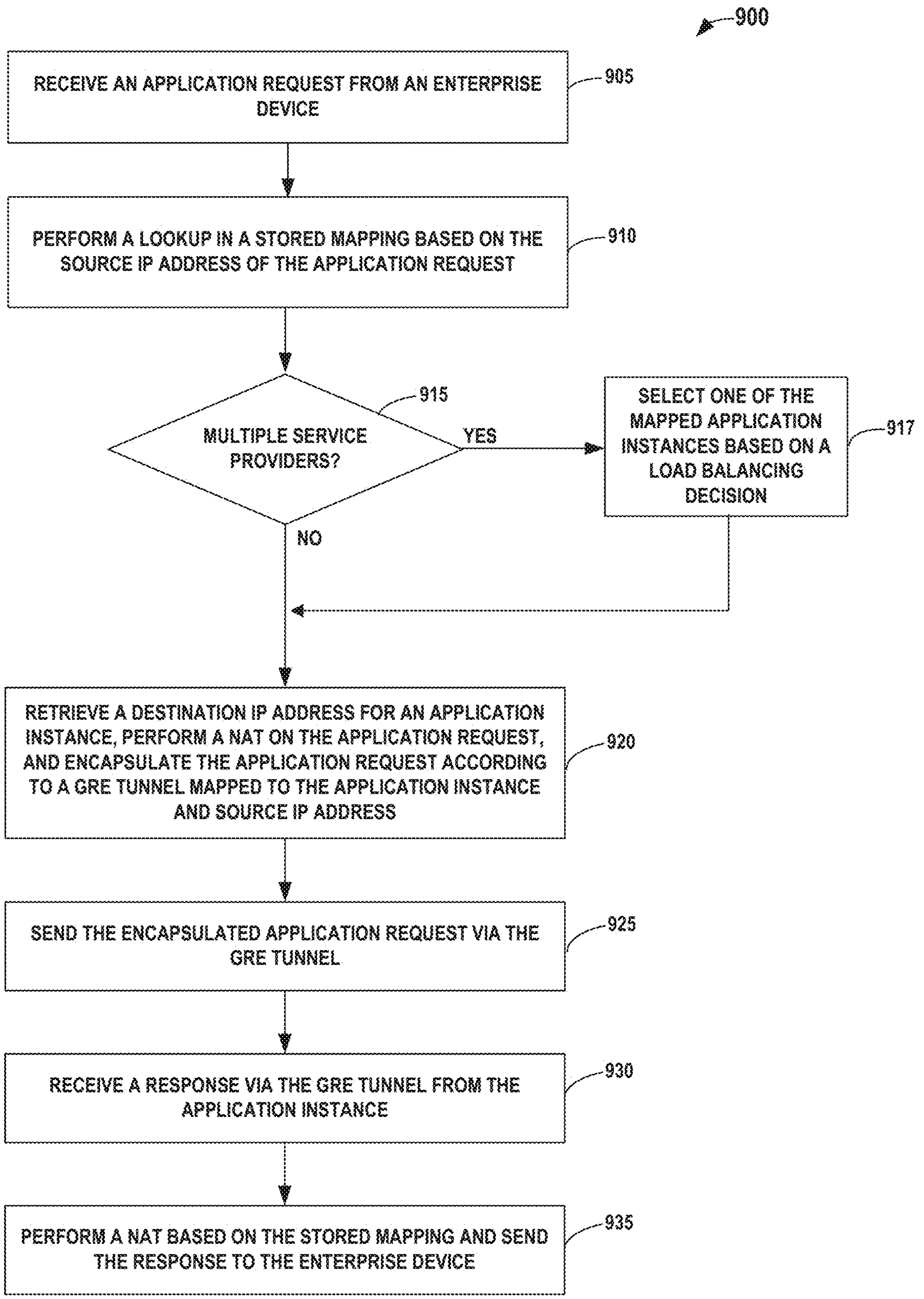
FIG. 9 is a flow diagram illustrating example operations of a method for processing network traffic associated with an established tunnel in a multi-tenant SaaS deployment, in accordance with one or more techniques of the disclosure.

FIG. 9 is a flow diagram illustrating example operations of a method for processing network traffic associated with an established tunnel in a multi-tenant SaaS deployment, in accordance with one or more techniques of the disclosure. A tunnel gateway device receives an application request from a network source, such as an enterprise device (905). The request can be received at an enterprise network tunnel (e.g., VRF tunnel) endpoint terminated at the tunnel gateway and established as described in more detail above with reference to operation 805 of FIG. 8. The application request can be sent subsequent to a connection request, via an established connection, and can include the client or user details requiring authentication in the example illustrated above in which the service provider devices provide network access control services, although other types of application requests and services can also be used in other examples.

The tunnel gateway performs a lookup in the mapping maintained in the connection table based on the source IP address obtained from the application request (910). The mapping could, for example, have been stored as explained above with reference to operation 820 of FIG. 8. The source IP address corresponds to a particular site associated with an enterprise network. However, the destination IP address of the application request (i.e., the tunnel endpoint terminated at the tunnel gateway device) can advantageously be the same for all sites associated with the enterprise network. Therefore, a host of an enterprise network can configure new sites and associated enterprise devices for use of the SaaS provided by the service provider devices relatively efficiently using the known destination IP address.

Accordingly, in this example, any number of sites can be served by one tunnel with this technology and every tenant of the SaaS will use the same service destination IP address that directs traffic to the tunnel gateway device via an established enterprise network tunnel. However, in other examples, any number of tunnels can serve one site (e.g., any number of enterprise devices deployed at the site).

The tunnel gateway determines whether multiple application instances are associated with the source IP address in the stored mapping (915). Multiple application instances will be indicated in the stored mapping when selected as described above with reference to operation 810 of FIG. 8.

If the tunnel gateway device determines that multiple application instances have been allocated to the source IP address ("YES" branch of 915), the tunnel gateway selects one of the mapped or allocated application instances based on a load balancing decision (917). Accordingly, the tunnel gateway device can periodically determine the load on each of the application instances to manage the distribution of application traffic more efficiently and provide faster service for the tenants of the SaaS.

Subsequent to selecting one of the application instances at operation 920, or if the tunnel gateway device determines that multiple application instances are not associated with the source IP address of the application request ("NO" branch of 915), the tunnel gateway device retrieves a destination IP address for the application instance (e.g., the application instance identified in the stored mapping or the one of the application instances selected in operation 910) (920) The tunnel gateway performs a NAT on the application request, and encapsulates the application request according to a GRE tunnel mapped to the application instance and source IP address in the stored mapping. The NAT replaces the service destination IP address in the application request with the destination IP address of the application instance. Optionally, the NAT and GRE tunnels addressing scheme can utilize class E IP addressing to ensure there are no overlap or collisions.

The tunnel gateway device sends the encapsulated application request via the GRE tunnel to the application instance or the service provider device hosting the application instance (925).

The application instance processes the application request and generates a response, which is received from the application instance by the tunnel gateway device via the GRE tunnel (930). In the example described earlier, the response can include an indication of whether the user of the one of the client devices is authorized to access the resource hosted by the one of the enterprise devices, although any other type of service and application response can be used in other examples.

The tunnel gateway device performs a NAT based on the stored mapping and sends the response to the enterprise device. For example, the NAT module will replace the destination IP address associated with the tunnel gateway with the IP address of the enterprise device. The tunnel gateway device can further send the response via the enterprise network tunnel established as described in operation 805 of FIG. 8 based on a route stored in the VRF table, for example, and assigned to the tunnel interface. Using the VRF route allows the network traffic associated with the particular connection between the tunnel gateway device and the one of the enterprise devices to be isolated from network traffic associated with other tenants.

In examples in which the proxy device is deployed into an enterprise network, the proxy device can terminate a connection with the enterprise devices associated with the enterprise network. Then, the proxy device can establish an enterprise network tunnel with the tunnel gateway device as described above. Accordingly, from the perspective of the enterprise devices, the service is still accessible via the same service or destination IP address for all of the enterprise devices, but the service of destination IP address endpoint is associated with the proxy device instead of the tunnel gateway device in these examples. Examples utilizing the proxy device may have some security advantages as compared to establishing tunnels directly from enterprise devices to a tunnel gateway device over a WAN.

Figure 10:
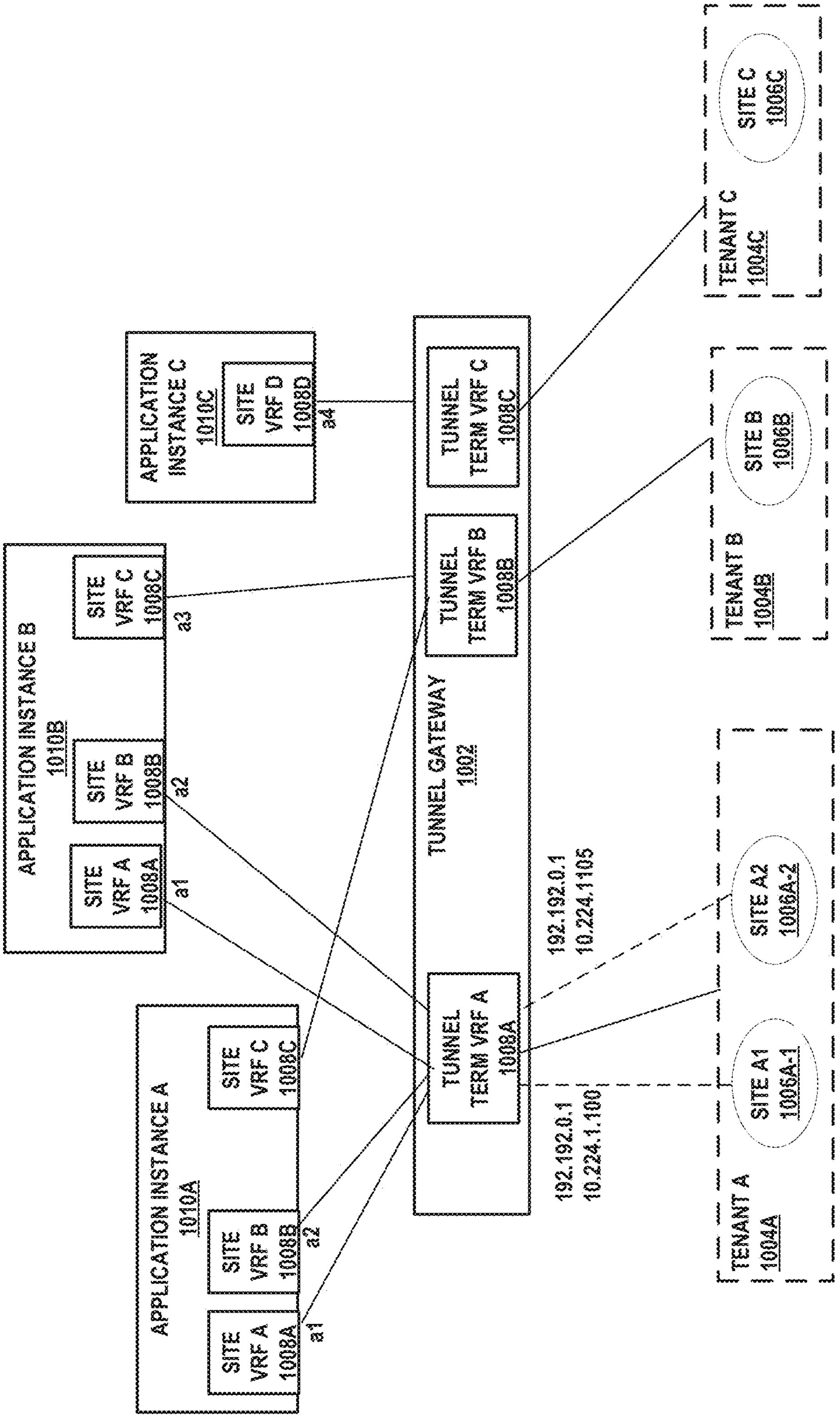
FIG. 10 is a conceptual diagram illustrating the operations of the example methods illustrated in FIGS. 8 and 9, in accordance with one or more techniques of the disclosure.

FIG. 10 is a conceptual diagram illustrating the operations of the example methods illustrated in FIGS. 8 and 9, in accordance with one or more techniques of the disclosure. The conceptual diagrams illustrate how multiple enterprise networks can utilize a tunnel gateway to access SaaS functionality in a multi-tenant deployment. In this particular example, one of the enterprise networks of tenant 1004A includes two sites, site 1006A-1 and 1006A-2, that can have any number of enterprise devices. The enterprise network of tenant 1004A has an established enterprise network tunnel with tunnel gateway 1002 that has a termination VRF 1008A. Additionally, termination VRF 1008A has two GRE tunnels with an application instance 1010A, one associated with site 1006A-1 and terminated at a destination IP address referred to in FIG. 10 as "a1" and the other associated with site 1006A-2 and terminated at a destination IP address referred to in FIG. 10 as "a2".

In one example, a first application request is initiated by an enterprise device at site 1006A-1 having a destination IP address of 192.192.0.1 and a source address of 10.224.1.100. In this example, site 1006A-2 can initiate a second application request having the same destination IP address but a different source IP address subnet, which differentiates between the various sites of the same enterprise network of tenant 1004A. When the first application request is received via the enterprise network tunnels (e.g., VRF tunnel), tunnel gateway 1002 performs a NAT to replace the destination IP address with 240.8.4.5 and encapsulates the resulting message using the 240.8.4.6 IP address mapped to the 240.8.4.5 in a stored mapping or connection table and corresponding to the GRE tunnel via which the first application message is then transmitted to the application instance.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

receiving, by one or more processors implementing a service provider, a connection request from an enterprise device via one or more communication networks;

generating, by the service provider, a route to the enterprise device, a logical tunnel with the enterprise device, and a first service port number for use by the enterprise device;

instantiating, by the service provider, a service process configured to listen for network traffic at a first service port associated with the first service port number;

storing an association of a source Internet protocol (IP) address of the enterprise device obtained from the connection request to the first service port number and to a logical tunnel interface for the logical tunnel, and an association of the logical tunnel interface to a virtual machine (VM) of a plurality of virtual machines (VMs) and to the route; and forwarding, by the service provider, an application request to the first service port for processing by the service process, the application request received from the enterprise device at a second port associated with a well-known port number and via the logical tunnel with the enterprise device.

2. The method of claim 1, wherein the service provider comprises a first service provider, the connection request comprises a first connection request, and the enterprise device comprises a first enterprise device, wherein the method further comprises:

receiving a second connection request from a second enterprise device;

in response to receiving the second connection request, determining a first geographic location of the second enterprise device;

selecting a second service provider based on proximity of the first geographic location to a second geographic location of the second service provider; and forwarding the second connection request to the second service provider.

3. The method of claim 1, wherein the service process is associated with a certificate and the method further comprises performing, by the service process, a cryptographic exchange based on the certificate with the enterprise device as part of generating the logical tunnel.

4. The method of claim 1, wherein the application request comprises the source IP address of the enterprise device, and wherein forwarding the application request to the first service port comprises identifying the first service port number associated with the first service port based on the stored association of the source IP address to the first service port number.

5. The method of claim 1, further comprising:

decrypting, by the service process, the application request;

identifying the VM from the plurality of VMs based on the stored associations of the source IP address obtained from the application request to the logical tunnel interface and the logical tunnel interface to the VM; and sending, by the service process to the identified VM, the decrypted application request.

6. The method of claim 5, further comprising:

sending, by the VM, the application request to an application instance of a plurality of application instances selected based on a load balancing decision;

processing, by the selected application instance, the application request;

identifying the route to the enterprise device based on the stored associations of the logical tunnel interface to the VM and to the route; and sending, by the service provider and to the enterprise device, a response to the application request via the service process and based on the route.

7. The method of claim 1, wherein the service provider is included in a plurality of service providers, wherein the method further comprises:

selecting, by a tunnel gateway, the service provider from the plurality of service providers, based on a load balancing decision;

generating a second logical tunnel with a plurality of enterprise devices coupled to an enterprise network; and storing a mapping of the source IP address of the enterprise device obtained from the connection request to a service destination IP address associated with an application instance of the selected service provider and a second logical tunnel interface for the second logical tunnel.

8. The method of claim 7, further comprising:

receiving, via the second logical tunnel, a second application request from the enterprise device of the plurality of enterprise devices, wherein the second application request comprises a first destination IP address of the tunnel gateway at which the second logical tunnel is terminated and the source IP address of the enterprise device;

modifying the second application request by replacing the first destination IP address with the service destination IP address associated with the application instance, wherein the service destination IP address is obtained from a stored mapping of the source IP address of the enterprise device to the service destination IP address associated with the application instance; and returning, to the enterprise device via the second logical tunnel, a response to the second application request received from the application instance after sending the modified application request to the application instance based on the service destination IP address.

9. The method of claim 8, further comprising:

encapsulating the modified application request; and sending the modified application request over a communication network via a generic routing and encapsulation (GRE) tunnel terminated at the application instance.

10. The method of claim 7, further comprising terminating a plurality of tunnels of a type of the second logical tunnel, wherein each of the plurality of tunnels is associated with a respective one of a plurality of enterprise networks and wherein each enterprise network of the plurality of enterprise networks comprises a plurality of sites each comprising a plurality of enterprise devices.

11. A system comprising:

one or more processors coupled to a memory; and a service provider executable by the one or more processors, wherein the service provider is configured to:

receive a connection request from an enterprise device via one or more communication networks, generate a route to the enterprise device, a logical tunnel with the enterprise device, and a first service port number for use by the enterprise device, instantiate a service process executable by the one or more processors and configured to listen for network traffic at a first service port associated with the first service port number, store an association of a source Internet protocol (IP) address of the enterprise device obtained from the connection request to the first service port number and to a logical tunnel interface for the logical tunnel, and an association of the logical tunnel interface to a virtual machine (VM) of a plurality of virtual machines (VMs) and to the route, and forward, by the service provider, an application request to the first service port for processing by the service process, the application request received from the enterprise device at a second port associated with a well-known port number and via the logical tunnel with the enterprise device.

12. The system of claim 11, wherein the service provider comprises a first service provider, the connection request comprises a first connection request, and the enterprise device comprises a first enterprise device, wherein the first service provider is configured to:

receive a second connection request from a second enterprise device;

in response to receipt of the second connection request, determine a first geographic location of the second enterprise device;

select a second service provider based on proximity of the first geographic location to a second geographic location of the second service provider; and forward the second connection request to the second service provider.

13. The system of claim 11, wherein the service process is associated with a certificate and wherein the service process is configured to perform a cryptographic exchange based on the certificate with the enterprise device as part of generation of the logical tunnel.

14. The system of claim 11, wherein the application request comprises the source IP address of the enterprise device, and wherein to forward the application request to the first service port, the service provider is configured to identify the first service port number associated with the first service port based on the stored association of the source IP address to the first service port number.

15. The system of claim 11, wherein the service process is configured to:

decrypt the application request;

identify the VM from the plurality of VMs based on the stored associations of the source IP address obtained from the application request to the logical tunnel interface and the logical tunnel interface to the VM; and send, to the identified VM, the decrypted application request.

16. The system of claim 15, wherein the VM is configured to send the application request to an application instance of a plurality of application instances selected based on a load balancing decision, wherein the selected application instance is configured to process the application request, and wherein the service provider is configured to:

identify the route to the enterprise device based on the stored associations of the logical tunnel interface to the VM and to the route; and send, to the enterprise device, a response to the application request via the service process and based on the route.

17. The system of claim 11, wherein the system further comprises:

a plurality of service providers, the plurality of service providers including the service provider; and a tunnel gateway executable by the one or more processors, the tunnel gateway configured to:

select the service provider from the plurality of service providers based on a load balancing decision, generate a second logical tunnel with a plurality of enterprise devices coupled to an enterprise network, and store a mapping of a source IP address of the enterprise device obtained from the connection request to a service destination IP address associated with an application instance of the selected service provider and a second logical tunnel interface for the second logical tunnel.

18. The system of claim 17, wherein the service process is configured to:

receive, via the second logical tunnel, a second application request from the enterprise device of the plurality of enterprise devices, wherein the second application request comprises a first destination IP address of the tunnel gateway at which the second logical tunnel is terminated and the source IP address of the enterprise device;

modify the second application request by replacing the first destination IP address with the service destination IP address associated with the application instance, wherein the service destination IP address is obtained from a stored mapping of the source IP address of the enterprise device to the service destination IP address associated with the application instance; and return, to the enterprise device via the second logical tunnel, a response to the second application request received from the application instance after sending the modified application request to the application instance based on the service destination IP address.

19. The system of claim 17, wherein the service provider is configured to terminate a plurality of tunnels of a type of the second logical tunnel, wherein each of the plurality of tunnels is associated with a respective one of a plurality of enterprise networks and wherein each enterprise network of the plurality of enterprise networks comprises a plurality of sites each comprising a plurality of enterprise devices.

20. A computer-readable medium having stored thereon instructions that when executed cause one or more processors of a service provider to:

receive a connection request from an enterprise device communicatively coupled to the service provider via one or more communication networks;

generate a route to the enterprise device, a logical tunnel with the enterprise device, and a first service port number for use by the enterprise device;

instantiate a service process executable by the one or more processors and configured to listen for network traffic at a first service port associated with the first service port number;

store an association of a source Internet protocol (IP) address of the enterprise device obtained from the connection request to the first service port number and to a logical tunnel interface for the logical tunnel, and an association of the logical tunnel interface to a virtual machine (VM) of a plurality of virtual machines (VMs) and to the route; and forward an application request to the first service port for processing by the service process, the application request received from the enterprise device at a second port associated with a well-known port number and via the logical tunnel with the enterprise device.

* * * * *